(12) United States Patent
Beck et al.

(10) Patent No.: US 10,960,756 B2
(45) Date of Patent: Mar. 30, 2021

(54) FILLER NECK

(71) Applicant: ILLINOIS TOOL WORKS INC., Glenview, IL (US)

(72) Inventors: Christian Beck, Röttingen (DE); Manuel Bachmann, Uettingen (DE); Matthias Kapaun, Gaukönigshofen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 245 days.

(21) Appl. No.: 16/061,515

(22) PCT Filed: Dec. 16, 2016

(86) PCT No.: PCT/US2016/067293
§ 371 (c)(1),
(2) Date: Jun. 12, 2018

(87) PCT Pub. No.: WO2017/116766
PCT Pub. Date: Jul. 6, 2017

(65) Prior Publication Data
US 2020/0231032 A1    Jul. 23, 2020

(30) Foreign Application Priority Data
Dec. 30, 2015 (DE) ............ 10 2015 122 940.4

(51) Int. Cl.
*B60K 15/04* (2006.01)
*B67D 7/02* (2010.01)
*B60K 15/03* (2006.01)

(52) U.S. Cl.
CPC ............ *B60K 15/04* (2013.01); *B67D 7/0294* (2013.01); *B60K 2015/03493* (2013.01); *B60K 2015/0461* (2013.01)

(58) Field of Classification Search
CPC .......... B60K 15/04; B60K 2015/03493; B60K 2015/0461; B67D 7/0294
See application file for complete search history.

(56) References Cited

U.S. PATENT DOCUMENTS 6,029,719 A     2/2000  Hor
8,087,434 B2 *  1/2012  Stephan ............ B60K 15/0406
                                                141/301
(Continued)

FOREIGN PATENT DOCUMENTS

CN      103459185 A     12/2013
CN      105015328 A     11/2015
(Continued)

OTHER PUBLICATIONS

PCT, International Search Report and Written Opinion, International Application No. PCT/US2016/067293; dated Mar. 7, 2017, 8 pages.

*Primary Examiner* — Craig M Schneider
*Assistant Examiner* — Jason K Niesz
(74) *Attorney, Agent, or Firm* — Thompson Hine LLP

(57) ABSTRACT

A filler neck for filling fuel into a vehicle tank includes a closure flap mounted for pivot between a closed position closing the filler neck and an open position releasing the filler neck and which is prestressed into the closed position by spring prestressing and is pivotable into the open position from the closed position by a fuel pump nozzle being hooked into a hooking-in position in the filler neck. A liquid outlet opening permits liquid accumulating in the filler neck when the closure flap is closed to drain out of the filler neck. A closure element is prestressed into an open position releasing the liquid outlet opening. The closure element is arranged and designed in such a manner that, by the fuel pump nozzle being hooked into the hooking-in position, the (Continued)

Figure 1:
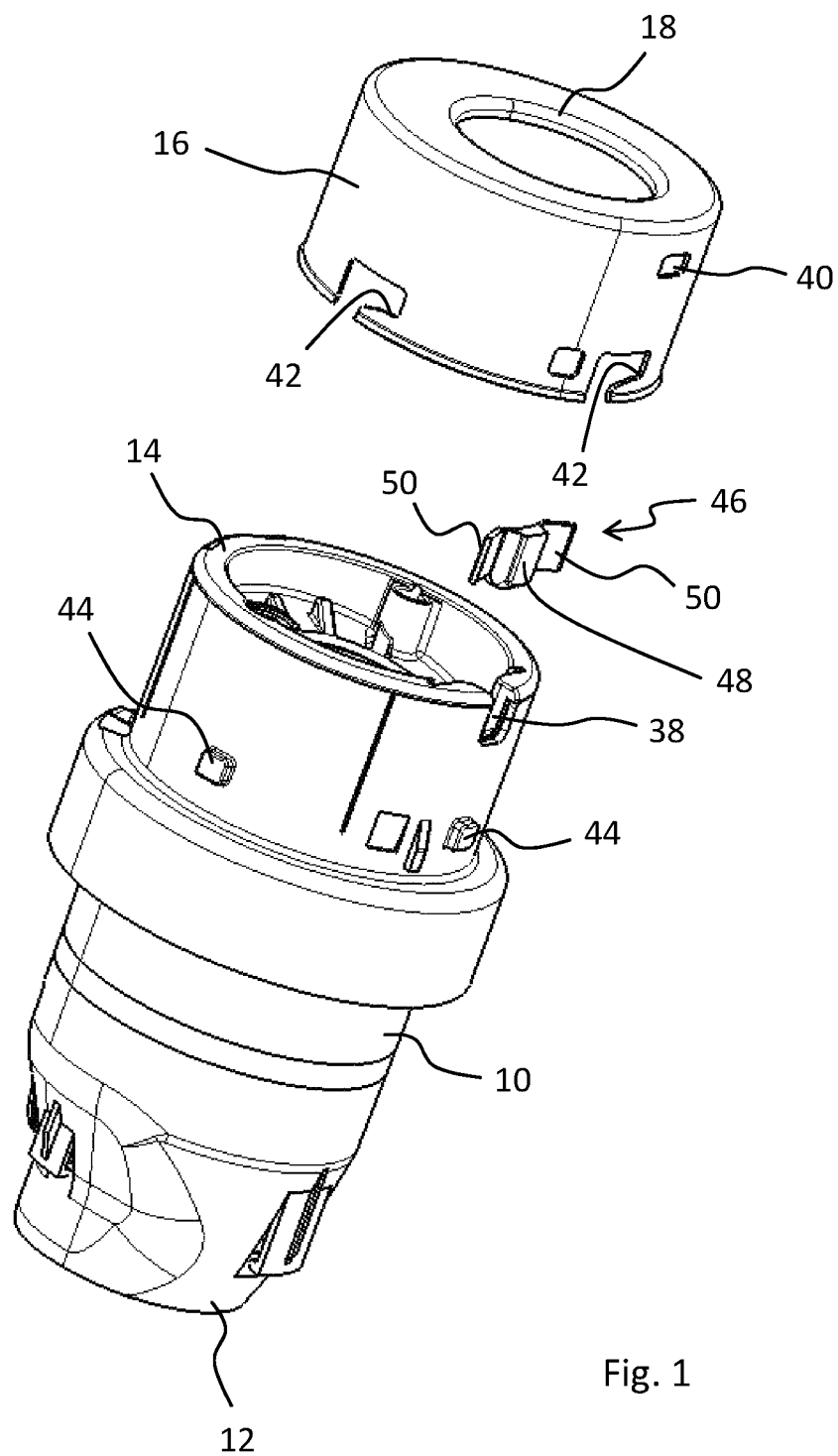

closure element is moved counter to the prestressing into a closure position closing the liquid outlet opening.

13 Claims, 4 Drawing Sheets

(56) References Cited

U.S. PATENT DOCUMENTS

| | | |
|---|---|---|
| 2006/0096662 A1 | 5/2006 | King |
| 2008/0067797 A1 | 3/2008 | Stephan |
| 2008/0237230 A1 | 10/2008 | Och |
| 2013/0341326 A1 | 12/2013 | Sasaki |
| 2015/0298542 A1 | 10/2015 | Kim |
| 2017/0072789 A1* | 3/2017 | Frank ................ B60K 15/04 |

FOREIGN PATENT DOCUMENTS

| | | |
|---|---|---|
| EP | 1262355 | 11/2003 |
| EP | 1642761 | 4/2006 |
| EP | 1712398 B1 | 11/2008 |
| EP | 2674318 | 12/2013 |

* cited by examiner

FILLER NECK

The invention relates to a filler neck for filling a fuel into a vehicle tank, comprising a closure flap which is mounted in the filler neck so as to be pivotable between a closed position closing the filler neck and an open position releasing the filler neck and which is prestressed into the closed position by means of spring prestressing and is pivotable into the open position from the closed position by a fuel pump nozzle being hooked into a hooking-in position in the filler neck and comprising a liquid outlet opening through which liquid accumulating in the filler neck when the closure flap is closed can drain out of the filler neck.

A filler neck for filling fuel into a vehicle tank is known, for example from EP 1 712 398 B1. In particular in the case of capless filler necks, liquid, in particular water, may collect in the filler neck above the (uppermost) closure flap. It is therefore known to provide a liquid outlet opening in a wall of the filler neck, through which liquid outlet opening said liquid can drain out of the filler neck.

To avoid emissions during a refueling operation, use is sometimes made of pump nozzles with a rubber end sleeve which rests tightly on the edge of the filler neck during the refueling operation. Emissions occurring during the refueling operation can be pressed via the rubber end sleeve into an activated carbon filter or can be sucked off out of the filler neck. Such an active or passive emission protection is interfered with by the liquid outlet opening. Thus, when emissions are sucked off via the rubber end sleeve, air is sucked up from the outside through the liquid outlet opening, and therefore the emissions which arise cannot be effectively sucked off. When the emissions are pressed into an activated carbon filter, emissions may escape via the liquid outlet opening into the environment.

Starting from the explained prior art, the invention is therefore based on the object of providing a filler neck of the type mentioned at the beginning which permits the drainage of liquid accumulated in the filler neck and at the same time meets the highest emission protection requirements.

The invention achieves the object by means of the subject matter of claim 1. Advantageous refinements are found in the dependent claims, the description and the figures.

For a filler neck of the type mentioned at the beginning, the invention achieves the object in that a closure element is provided which is prestressed into an open position releasing the liquid outlet opening, wherein the closure element is arranged and designed in such a manner that, by the fuel pump nozzle being hooked into the hooking-in position, said closure element is moved counter to the prestressing into a closure position closing the liquid outlet opening.

The filler neck according to the invention can serve for filling a fuel, for example a diesel fuel or gasoline, into a fuel tank. However, the operating substance may also be a different operating substance, for example an Adblue fluid. The filler neck can be equipped with a mis-fueling inhibitor MFI. However, a conventional filler neck without a mis-fueling inhibitor may also be used. The filler neck can be designed with or without valves. The filler neck can be a capless filler neck or a cap-based filler neck. However, the use of the invention in the case of a capless filler neck is preferred since cap-based systems frequently also manage without a liquid outlet opening because of the generally tight outer closure cap. The tubular portion of the filler neck, in which the closure flap is arranged, can be composed of plastic or metal. A filler neck head placed onto the tubular portion can likewise be composed of metal or plastic. The fastening of the head to the tubular portion can be undertaken, for example, by means of crimping or welding.

The closure flap can close the filler neck in the closed position in particular in a sealing manner. If the filler neck has two pivotable closure flaps arranged one behind the other, both closure flaps or only one of the closure flaps can close the filler neck in a sealing manner in the closed position.

The filler neck according to the invention has a liquid outlet opening which can be arranged in particular above the (uppermost) closure flap. The problem of liquid accumulation is particularly present there in particular in the case of capless systems. The liquid outlet opening can be formed by a hole in the wall of the filler neck or of the tubular portion of the filler neck. Via said liquid outlet opening, water or similar collecting in the filler neck, in particular above the closure flap, drains out of the filler neck to the outside.

As is known, pump nozzles for refueling a vehicle with a fuel are hooked into a hooking-in position in the filler neck. The pump nozzles remain in the said hooking-in position during the refueling, even if they are let go of by the operator. For this purpose, a projection is provided, for example on the outer side of the pump nozzle, said projection engaging behind a corresponding hooking-in projection on the filler neck in the hooking-in position such that the pump nozzle is held in the hooking-in position.

According to the invention, a closure element is provided which is prestressed into an open position in which said closure element permits the drainage of liquid through the liquid outlet opening. The closure element is arranged and designed in such a manner that, by the fuel pump nozzle being hooked into the hooking-in position, said closure element is moved counter to its prestressing into a closure position in which it closes the liquid outlet opening, in particular closes same in a sealing manner. The closure element is pressed here into its closure position in particular by direct contact with the pump nozzle. In particular, no coupling of the closure element to the closure flap or the like is provided. In any case, such a coupling would not be possible above the (uppermost) closure flap. It is possible in particular here for the closure element to be pressed into the open position by means of a hooking-in projection on the pump nozzle.

According to the invention, the closure element ensures that the liquid outlet opening is closed during a refueling operation. The tightness during a refueling operation is therefore improved and emissions are reduced. In particular, according to the invention, an above-explained active or passive emission protection, in which emissions are pressed into an activated carbon filter or are sucked off out of the filler neck via a rubber end sleeve placed onto the filler neck, is not interfered with by the liquid outlet opening. On the contrary, when the emissions are pressed into the activated carbon filter, it is ensured that emissions cannot escape to a significant extent through the liquid outlet opening into the surroundings, or it is avoided during a sucking-up of the emissions that air is sucked up from the surroundings via the liquid outlet opening in an interfering manner. At the same time, the invention is distinguished by a simple design. Owing to the automatic movement of the closure element into the closure position when the fuel pump nozzle is hooked into the hooking-in position, the closure of the liquid outlet opening during a refueling operation is furthermore reliably ensured at all times. No further step is required by the operator in order to ensure the required tightness of the filler neck during a refueling operation.

According to a refinement, the closure element can be elastic and, by the fuel pump nozzle being hooked into the hooking-in position, can be elastically deformed from the open position into the closure position. The closure element can be connected integrally to the tubular portion of the filler neck. However, it may also be designed as a separate element. The abovementioned refinement permits particularly simple production and installation. In particular, no complicated measures for a moveable mounting, for example a pivot mounting, are required of the filler neck. On the contrary, the closure element itself is resiliently elastic, i.e. forms a closure spring element. By the fuel pump nozzle being introduced into the hooking-in position, the closure element is elastically deformed from the open position in order to take up the closure position. After the fuel pump nozzle is removed from the filler neck, the closure element then automatically moves back into the open position forming an inoperative position of the closure element.

According to a further refinement, the closure element can have a closure body closing the liquid outlet opening in the closure position, and at least one holding arm held in a receiving groove of the filler neck. The holding arm can be held in the receiving groove, for example, by being clipped therein. It is also possible to provide two holding arms which are then each held in a receiving groove. The closure element can be, for example, of T-shaped design in cross section, wherein the closure body forms the web of the T shape and the two holding arms form the arms of the T shape. For example, the closure element can be inserted together with the holding arm or holding arms into the receiving groove(s) from above and subsequently a cap-like head can be placed onto the tubular portion of the filler neck and fastened, for example by means of latching. The holding arm or the holding arms is/are then retained in the receiving groove(s) and the closure element is therefore securely held. The installation is thus further simplified.

The closure element can be composed of a plastics material. It is then particularly simple and flexible to produce and provides a good sealing effect. However, it is also possible for the closure element to be composed of a metal material.

According to a further refinement, the closure element can have a hard component and a soft component, wherein the soft component is composed of a softer plastic than the hard component. By means of a suitable arrangement of the soft component, the sealing effect of the closure element in the closed position can be optimized. For example, the closure body of the closure element can be completely composed of the soft component or a sealing lip which is adapted to the edge of the liquid outlet opening can be composed of the soft component. In particular, the portions of the closure element that hold the closure element on the filler neck, for example the holding arms can be composed of the hard component. The production of such a closure element is possible in a simple manner in a two-component injection molding process. Alternatively, of course, production of the entire closure element from only one material is also possible.

In principle, it is also conceivable for the closure element to be mounted on the filler neck so as to be pivotable between the open position and the closure position. The pivotable mounting can be realized, for example, by a suitable hinge, for example a film hinge or the like. However, a pivot axis which is mounted rotatably in a corresponding bearing receptacle of the filler neck is also conceivable.

According to a further refinement, it can be provided that a further closure flap is mounted in the filler neck towards the tank so as to be pivotable between a closed position closing the filler neck and an open position releasing the filler neck, wherein the further closure flap is also prestressed into the closed position by spring prestressing and, by the fuel pump nozzle being hooked into the hooking-in position, is pivotable from the closed position into the open position. In this refinement, in addition to the first closure flap, a second closure flap is therefore arranged between the first closure flap and the connection of the filler neck to a refueling pipe leading to the fuel tank. In particular in the case of capless systems, two closure flaps are frequently provided. In this refinement, the liquid outlet opening can be arranged above the uppermost closure flap. However, it is also conceivable for the liquid outlet opening to be arranged in the space between the two closure flaps. The last-mentioned refinement is conceivable in particular if the uppermost closure flap in its closed position does not close the filler neck in a sealing manner.

According to a further refinement, it can be provided that a mis-fueling inhibiting device is provided which is arranged in the filler neck, and, in a closure position, prevents pivoting of at least one closure flap by means of the fuel pump nozzle into the open position, and, by means of the fuel pump nozzle, is movable from its closure position into a release position releasing the pivoting of the at least one closure flap by means of the fuel pump nozzle into the open position. The mis-fueling inhibitor (MFI) can be arranged in the filler neck above the (uppermost) closure flap. It can then block an opening of the first (uppermost) closure flap if an incorrect pump nozzle is inserted. However, it is also conceivable for the mis-fueling inhibitor to be arranged between the closure flaps when two closure flaps are present. The mis-fueling inhibitor can then block the opening of the second closure flap (towards the tank) when an incorrect pump nozzle is inserted. The mis-fueling inhibitor can basically be configured as described, for example, in EP 1 712 398 B1.

Figure 2:
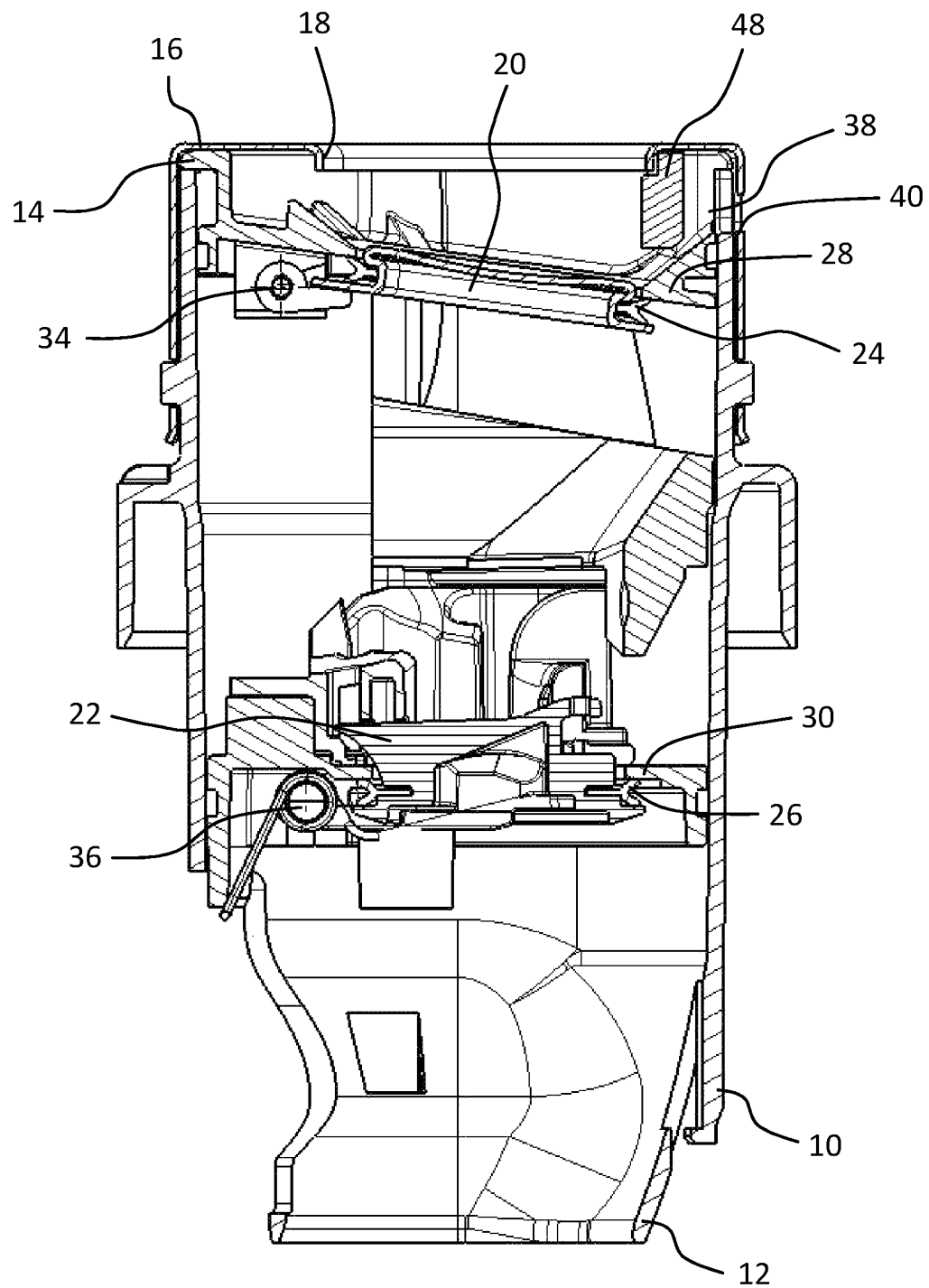
Figure 3:
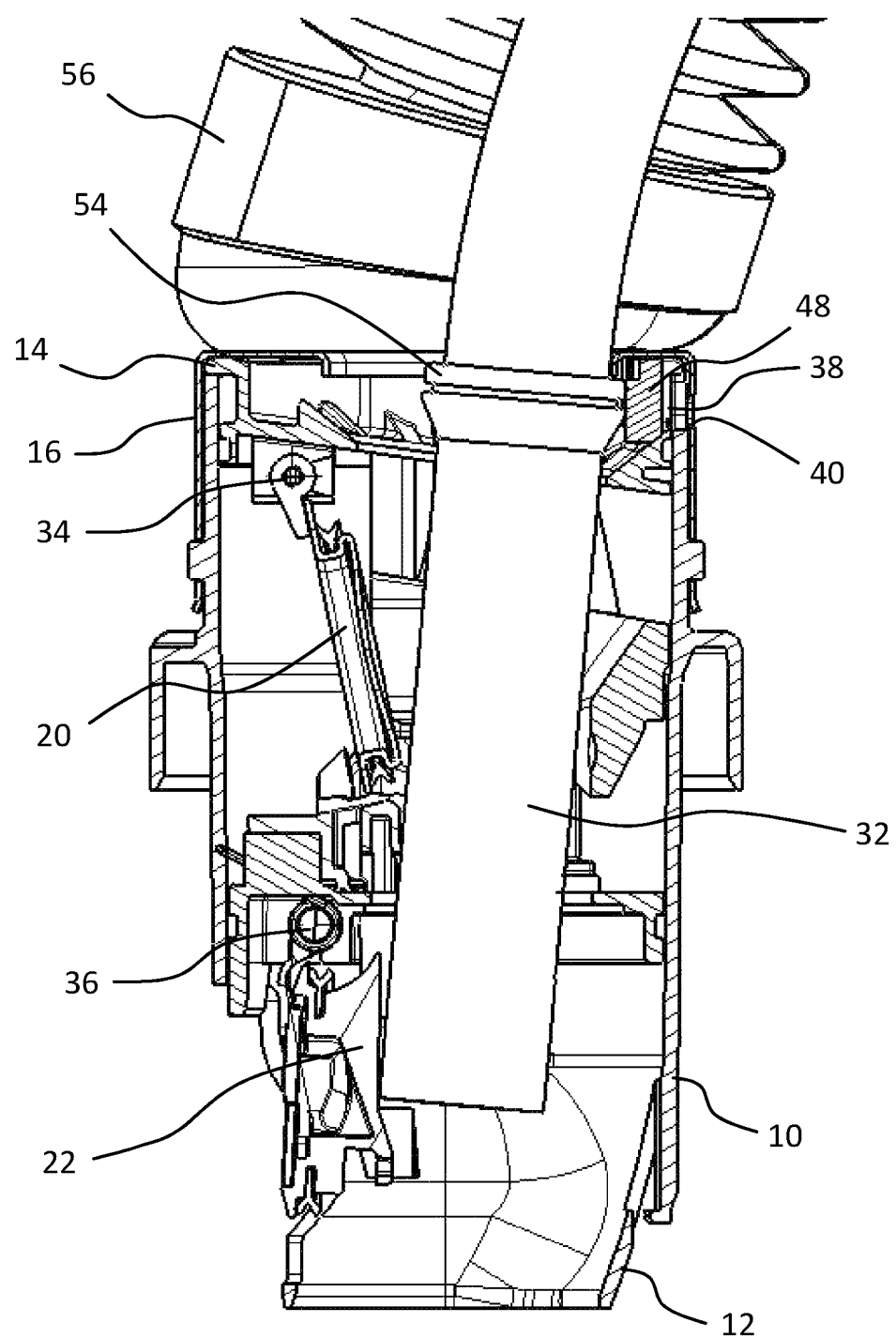
Figure 4:
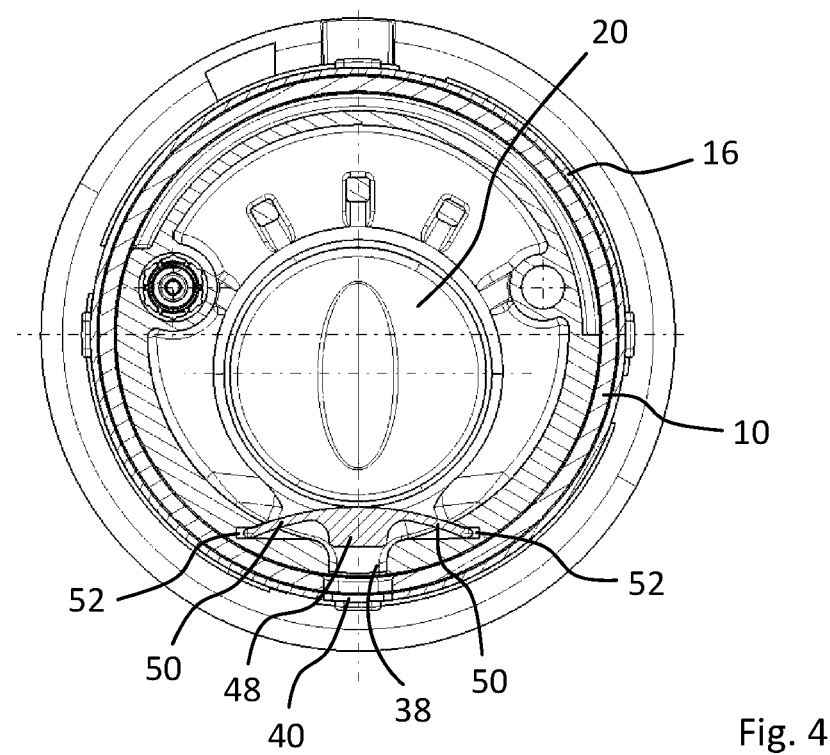
Figure 5:
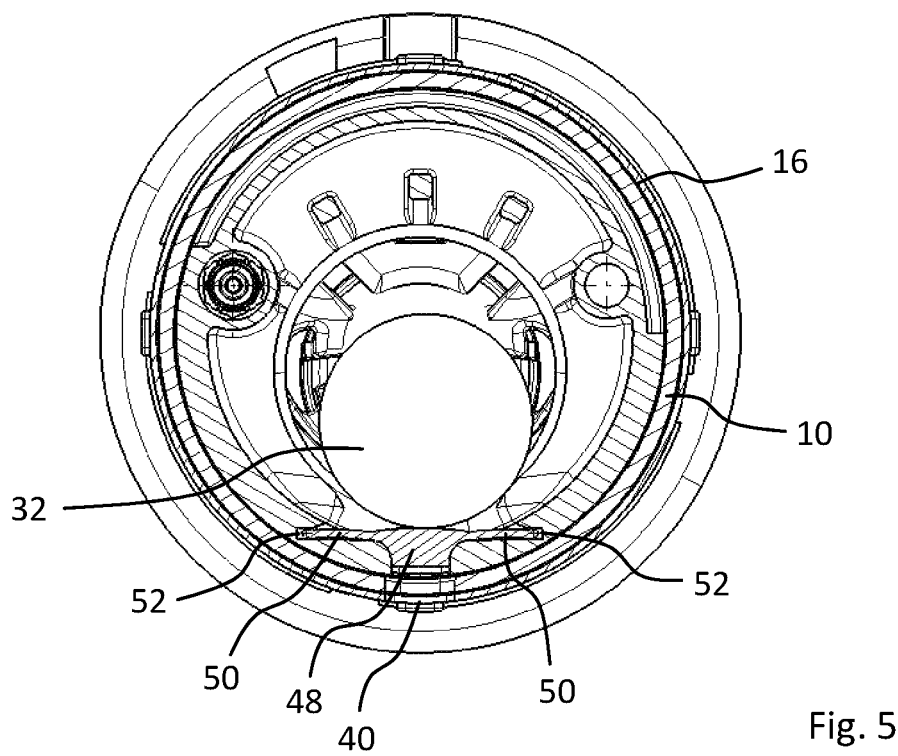

An exemplary embodiment of the invention is explained in more detail below with reference to figures, in which, schematically:

FIG. 1 shows a filler neck according to the invention in a perspective exclusion illustration, FIG. 2 shows a longitudinal sectional view of the filler neck from FIG. 1, FIG. 3 shows the view from FIG. 2 when the fuel pump nozzle is inserted into the filler neck, FIG. 4 shows a cross-sectional view of the filler neck shown in FIG. 2, and FIG. 5 shows a cross-sectional view of the filler neck shown in FIG. 2, when the fuel pump nozzle is inserted into the filler neck.

Unless stated otherwise, the same reference signs in the figures refer to the same objects.

The filler neck according to the invention shown in the figures serves for filling a fuel into a vehicle tank. The fuel can be, for example, in particular diesel fuel or gasoline or an operating substance, for example an Adblue liquid. The filler neck has a tubular portion 10, the lower, first end 12 of which in FIG. 1 is connected to a refueling pipe leading to the vehicle tank. The upper, second end 14 of the tubular portion 10, which end is opposite the first end 12 towards the tank in FIG. 1, is provided for the insertion of a fuel pump nozzle. In the ready mounted state, said second end 14 of the tubular portion 10 is closed by a cap-like head 16. The head 16 has an insertion opening 18 for the insertion of a fuel pump nozzle.

As seen in the insertion direction of a fuel pump nozzle, first of all a first closure flap 20, and behind the latter a second closure flap 22, are mounted pivotably in the tubular portion of the filler neck. The two closure flaps 20, 22 are prestressed into closed position which is shown in FIG. 2 and in which they close the filler neck. The first closure flap 20 has a first cross-sectionally Y-shaped sealing lip 24 running over its circumference, and the second closure flap 22 has a second cross-sectionally Y-shaped sealing lip 26 running over its circumference. In the closed position shown in FIG. 2, the sealing lips 24, 26 each lie against an associated annular contact surface 28 or 30 of the filler neck. In this manner, the closure flaps 20, 22 in their closed position close the passage through the filler neck in a sealing manner. The filler neck shown in the figures is a capless filler neck.

By the insertion of a fuel pump nozzle 32, as shown in FIG. 3 the first closure flap 20 can be pivoted about a pivot axis 34 from the closed position to the open position which is shown in FIG. 3 and in which it releases the passage through the filler neck. In a corresponding manner, by insertion of the fuel pump nozzle 32, the second closure flap 22 can likewise be pivoted about its pivot axis 36 into the open position which is shown in FIG. 3 and releases the filler neck. The pivoting of the closure flaps 20, 22 by the fuel pump nozzle 32 in each case takes place here counter to their prestressing, which is provided, for example, by a spring, and therefore, after the withdrawal of the fuel pump nozzle 32, the closure flaps 20, 22 move back again into their closed position shown in FIG. 2.

In the closed state of the closure flaps 20, 22 that is shown in FIG. 2, liquid, for example water, can collect in particular in the space above the first closure flap 20. So that said liquid can drain out of the filler neck, the upper side of the tubular portion 10 has a slot-like recess 38. Said recess 38 forms a liquid outlet opening 38. Of course, different liquid outlet openings would also be possible. The head 16 of the filler neck has an opening 40 which, when the head 16 is fastened on the tubular portion 10, comes into overlap with the liquid outlet opening 38. Liquid accumulating above the first closure flap 20 can drain out of the filler neck to the outside through the liquid outlet opening 38 and the opening 40. As can be seen, in particular in FIG. 1, the lower side of the head 16 has a plurality of latching recesses 42 which, in the mounted state, come into engagement with corresponding latching projections 44 of the tubular portion 10 such that the head 16 is held in a latching manner on the tubular portion 10.

The filler neck shown in the figures furthermore has a closure element 46, with a central closure body 48 and two holding arms 50 extending away from the closure body 48. The closure element 46 therefore has a T shape in cross section, wherein the closure body 48 forms the web and the holding arms 50 form the arms of the T shape. As can be seen in particular in FIGS. 4 and 5, the holding arms 50 are each held in a receiving groove 52 of the tubular portion 10 of the filler neck. The closure element is inserted with its holding arms 50 into the receiving grooves 52 from above in FIG. 1. The head 16 is subsequently mounted on the tubular portion 10, and therefore the closure element 46 is subsequently retained by its holding arms 50 in the receiving grooves 52.

The closure element 46, which is composed, for example, of a plastics material, is resiliently elastic in the exemplary embodiment shown, wherein in FIG. 2 and FIG. 4 show an inoperative position of the closure element 46. Said inoperative position defines an open position of the closure element 46 in which liquid can flow past the closure element 46 out of the space above the first closure flap 20 through the liquid outlet opening 38. If a fuel pump nozzle 32 is hooked into the hooking-in position (shown in FIGS. 3 and 5) in the filler neck, the closure element 46 is pressed under elastic deformation into a closure position (shown in FIGS. 3 and 5) in which the closure body 48 of the closure element 46 closes the liquid outlet opening 38, and therefore substantially no liquid or air can enter or exit through the liquid outlet opening 38.

It can be seen in particular in FIG. 3 that the fuel pump nozzle 32 in a manner known per se has an encircling hooking-in projection 54 which, in the hooking-in position shown in FIG. 3, engages behind a corresponding hooking-in projection of the filler neck. As a result, the hooking-in position of the fuel pump nozzle 32 is defined. In the exemplary embodiment illustrated, the closure element 46 is pressed by the hooking-in projection 54 formed on the fuel pump nozzle 32 from the open position to the closure position.

In addition, it can be seen in FIG. 3 that, in the case of the fuel pump nozzle 32 shown, a rubber end sleeve 56 rests on the upper side of the filler neck in a sealing manner during the refueling operation. Via said rubber end sleeve 56, emissions occurring during the refueling operation can either be pressed into an activated carbon filter or sucked off out of the filler neck without the liquid outlet opening 38 impeding this.

The tubular portion 10 of the filler neck illustrated in the figures can be composed of a metal material or a plastics material. The head 16 of the filler neck shown in the figures can also be composed of a metal material or plastics material. In addition, a mis-fueling inhibitor (MFI) can be arranged in the filler neck.

LIST OF REFERENCE SIGNS

10 Tubular portion
12 First end
14 Second end
16 Head
18 Insertion opening
20 First closure flap
22 Second closure flap
24 First sealing lip
26 Second sealing lip
28 Contact surface
30 Contact surface
32 Fuel pump nozzle
34 Pivot axis
36 Pivot axis
38 Liquid outlet opening
40 Opening
42 Latching recess
44 Latching projection
46 Closure element
48 Closure body
50 Holding arms
52 Receiving grooves
54 Hooking-in projection
56 Rubber end sleeve

The invention claimed is:
1. A filler neck for filling a fuel into a vehicle tank, comprising a closure flap that is mounted in the filler neck so as to be pivotable between a closed position closing the filler neck and an open position releasing the filler neck, where the closure flap is prestressed into the closed position by means of spring prestressing and is pivotable into the open position from the closed position by a fuel pump nozzle being hooked into a hooking-in position in the filler neck, and further comprising a liquid outlet opening through which liquid accumulating in the filler neck when the closure flap is closed can drain out of the filler neck, wherein a closure element is provided which is prestressed into an open position releasing the liquid outlet opening, wherein the closure element is arranged and designed in such a manner that, by the fuel pump nozzle being hooked into the hooking-in position, said closure element is moved counter to the prestressing into a closure position closing the liquid outlet opening, wherein the closure element comprises a closure body that closes the liquid outlet opening in the closure position, and at least one holding arm held in a receiving groove of the filler neck, wherein the closure element is elastic and, by the fuel pump nozzle being hooked into the hooking-in position, is elastically deformed from the open position into the closure position.

2. The filler neck according to claim 1, wherein the filler neck includes a tubular portion in which the liquid outlet opening and the receiving groove are formed, wherein the closure element is formed separately from the tubular portion and the closure element is retained to the tubular portion by the at least one holding arm held in the receiving groove.

3. The filler neck according to claim 1, wherein the closure element is composed of a plastics material.

4. The filler neck according to claim 3, wherein the closure element has a hard component and a soft component, wherein the soft component is composed of a softer plastic than the hard component.

5. The filler neck according to claim 1, wherein a further closure flap is mounted in the filler neck towards the tank so as to be pivotable between a closed position closing the filler neck and an open position releasing the filler neck, wherein the further closure flap is also prestressed into the closed position by spring prestressing and, by the fuel pump nozzle being hooked into the hooking-in position, is pivotable from the closed position into the open position.

6. The filler neck according to claim 5, characterized in that a mis-fuelling inhibiting device is provided which is arranged in the filler neck and, in a closure position, prevents pivoting of at least one closure flap by means of the fuel pump nozzle into the open position, and, by means of the fuel pump nozzle, is moveable from its closure position into a release position releasing the pivoting of the at least one closure flap by means of the fuel pump nozzle into the open position.

7. A filler neck for filling a fuel into a vehicle tank, comprising:
a closure flap mounted in the filler neck so as to be pivotable between a closed position closing the filler neck and an open position opening the filler neck, where the closure flap is prestressed into the closed position and is pivotable into the open position from the closed position by a fuel pump nozzle being inserted into the filler neck, and further comprising a liquid outlet opening above the closure flap and through which liquid accumulating in the filler neck when the closure flap is closed can drain out of the filler neck, wherein a closure element is provided which is prestressed into an open position opening the liquid outlet opening, wherein the closure element is movable into a closure position closing the liquid outlet opening by the fuel pump nozzle being inserted into the filler neck, wherein the filler neck includes a receiving groove alongside the liquid outlet opening, wherein the closure element is formed separately from the filler neck and attached thereto, wherein the closure element includes a closure body that closes the liquid outlet opening in the closure position, and at least one holding arm held in the receiving groove of the filler neck, wherein the closure element is mounted on the filler neck so as to be pivotable between the open position and the closure position.

8. The filler neck according to claim 7, wherein the filler neck includes a tubular portion in which the liquid outlet opening is located, and the receiving groove is located along an inner surface of the tubular portion.

9. The filler neck according to claim 7, wherein the closure element is composed of a plastics material.

10. The filler neck according to claim 9, wherein the closure element has a hard component and a soft component, wherein the soft component is composed of a softer plastic than the hard component.

11. A filler neck for filling a fuel into a vehicle tank, comprising:
a closure flap mounted in the filler neck so as to be pivotable between a closed position closing the filler neck and an open position opening the filler neck, where the closure flap is prestressed into the closed position and is pivotable into the open position from the closed position by a fuel pump nozzle being inserted into the filler neck, and further comprising a tubular portion with a liquid outlet opening above the closure flap and through which liquid accumulating in the filler neck when the closure flap is closed can drain out of the filler neck, wherein a closure element is provided which is prestressed into an open position opening the liquid outlet opening, wherein the closure element is movable into a closure position closing the liquid outlet opening by the fuel pump nozzle being inserted into the filler neck, wherein the outlet opening is a slot-like recess in the tubular portion of the filler neck, wherein the tubular portion further includes a first receiving groove at a first side of the slot-like recess, wherein the closure element is formed separately from the filler neck and attached thereto, wherein the closure element includes a closure body that closes the liquid outlet opening in the closure position, and a first holding arm held in the first receiving groove.

12. The filler neck according to claim 11, wherein the tubular portion further includes a second receiving groove at a second side of the slot-like recess, wherein the closure element includes a second holding arm held in the second receiving groove.

13. The filler neck according to claim 12, wherein the closure body, the first holding arm and the second holding arm together form a T-shape.

* * * * *